United States Patent
Bannai et al.

Patent Number: 5,304,071
Date of Patent: Apr. 19, 1994

[54] CLOCK SPRING

[75] Inventors: Hiroyuki Bannai, Furukawa; Hironori Kato, Sendai, both of Japan

[73] Assignee: Alps Electric Co., Ltd., Tokyo, Japan

[21] Appl. No.: 97,693

[22] Filed: Jul. 27, 1993

Related U.S. Application Data

[60] Division of Ser. No. 939,568, Sep. 3, 1992, which is a continuation of Ser. No. 714,283, Jun. 12, 1991, abandoned.

[30] Foreign Application Priority Data

Apr. 14, 1990 [JP] Japan ................ 2-62195[U]

[51] Int. Cl.$^5$ ............................................ H01R 35/04
[52] U.S. Cl. ........................................ 439/164; 439/15
[58] Field of Search .................................. 439/15, 164

[56] References Cited

U.S. PATENT DOCUMENTS

| | | | |
|---|---|---|---|
| 3,763,455 | 10/1973 | Confer et al. | 439/15 |
| 4,540,223 | 9/1985 | Schmerda et al. | 439/15 |
| 4,721,469 | 1/1988 | Carlson | 439/15 |
| 4,927,365 | 5/1990 | Schauer et al. | 439/15 |
| 4,928,901 | 5/1990 | Bannai et al. | 439/15 |
| 5,149,273 | 9/1992 | Bannai et al. | 439/164 |

Primary Examiner—Gary F. Paumen
Attorney, Agent, or Firm—Guy W. Shoup; Patrick T. Bever

[57] ABSTRACT

A clock spring for use with a steering device of an automobile, including a fixed member, a movable member rotatably mounted on the fixed member with a cable accommodating portion defined therebetween, and a cable accommodated in the cable accommodating portion for effecting electrical connection between the fixed member and the movable member. One end of the cable is fixed to the fixed member and led out of the fixed member, while the other end of the cable is fixed to the movable member and led out of the movable member. One portion of the cable is wrapped in one direction on either of the fixed member or the movable member, while the other portion is wrapped in the opposite direction reverse to the one direction on the other of the fixed member and the movable member, whereby an inverted portion of the cable is formed between the one portion and the other portion. The improvement of the clock spring resides in the point that at least one of opposed surfaces of the fixed member and the movable member is provided with an outwardly expanded portion. With this construction, buckling or rupture due to bending fatigue of the inverted portion of the cable is prevented.

1 Claim, 9 Drawing Sheets

CLOCK SPRING

This application is a division of application Ser. No. 07/939,568, filed Sep. 3, 1993; which is a continuation of application Ser. No. 07/714,283, filed Jun. 12, 1991, abandoned.

BACKGROUND OF THE INVENTION

1. Field of the Invention

The present invention relates to a clock spring connector for use with a steering device of an automobile, for example, including a fixed member, a movable member, and a cable for effecting electrical connection between the fixed member and the movable member.

2. Description of Related Art

A clock spring connector is generally constructed of a fixed member, a movable member rotatably mounted on the fixed member, a flexible cable connecting the fixed member and the movable member. Such a clock spring connector is used as an electrical connecting device for effecting electrical connection between the fixed member and the movable member adapted to be rotated with a finite number of revolutions as in a steering device of an automobile.

In a known clock spring connector of this kind, a cable accommodating portion is defined between the fixed member and the movable member, and a flat cable formed by laminating a pair of strip films with a plurality of conductors sandwiched therebetween is loosely accommodated in the cable accommodating portion under a spirally wrapped condition. One end of the flat cable is fixed to an outer cylindrical portion formed on either the fixed member or the movable member, while the other end of the flat cable is fixed to an inner cylindrical portion formed on the other of the fixed member and the movable member.

When the movable member of the clock spring connector is rotated, the flat cable accommodated in the cable accommodating portion can be wrapped onto the inner cylindrical portion from the outer cylindrical portion or unwrapped from the inner cylindrical portion to the outer cylindrical portion according to a rotational direction of the movable member. Accordingly, while the flat cable is being unwrapped from the inner cylindrical portion to the outer cylindrical portion, almost no tension is applied to the flat cable, and electrical connection between the fixed member and the movable member rotating relative thereto can be maintained at all times.

The wrapping and unwrapping of the flat cable is carried out by utilizing a difference in diameter between the outer cylindrical portion and the inner cylindrical portion. Therefore, assuming that a rotational amount of the movable member is fixed, the larger the difference in diameter, the smaller the length of a flat cable that is necessary. However, the diameter of the inner cylindrical portion is dependent upon a diameter of a rotating shaft on which the clock spring connector is mounted, e.g., a steering shaft of an automobile. On the other hand, the diameter of the outer cylindrical portion cannot be made too large because a compact size of the clock spring connector is desirable. For these reasons, the difference in diameter between the outer cylindrical portion and the inner cylindrical portion cannot be made extremely large. Accordingly, such a clock spring connector generally requires a long flat cable, which is difficult to manufacture as is well known. As a result, a total cost of the clock spring connector is increased.

SUMMARY OF THE INVENTION

It is accordingly an object of the present invention to provide an inexpensive clock spring connector which can greatly reduce the length of the cable.

It is another object of the present invention to provide a reliable clock spring connector which can prevent buckling of the cable and rupture of the cable due to bending fatigue.

According to one aspect of the present invention, a plurality of first concentric grooves and second concentric grooves are provided in a cable accommodating portion defined between a fixed member and a movable member, and are arranged in opposed relationship to each other. A plurality of wirelike cables are accommodated in the first and second concentric grooves. One portion of the cables is wrapped in one direction within either of the first concentric grooves or the second concentric grooves, and the other portion is wrapped in the opposite direction reverse to the one direction within the other of the first concentric grooves and the second concentric grooves, whereby an inverted portion of each cable is formed between the one portion and the other portion. Furthermore, a radius of curvature of the inverted portion of each cable is made large in a rotational neutral condition of the movable member.

According to another aspect of the present invention, one of the fixed member and the movable member is provided with an inner cylindrical portion, and the other is provided with an outer cylindrical portion. A cable is accommodated between the inner cylindrical portion and the outer cylindrical portion. One portion of the cable is wrapped in one direction on an outer surface of the inner cylindrical portion, and the other portion is wrapped in the opposite direction reverse to the one direction on an inner surface of the outer cylindrical portion, whereby an inverted portion of the cable is formed between the one portion and the other portion. Furthermore, a radius of curvature of the inverted portion of the cable is made large in a rotational neutral condition of the movable member.

In the clock spring connector mounted in a steering device of an automobile, the movable member of the clock spring connector is operated most frequently in the rotational neutral condition because a steering wheel rotating the movable member is operated almost at a central position in a rotatable range of the steering wheel or in the vicinity of the central position. A bending stress is generated in the inverted portion of the cable wrapped in the cable accommodating portion. However, since a radius of curvature of the inverted portion is made large in the rotational neutral condition, there is no possibility of buckling or rupture due to bending fatigue of the inverted portion.

In operation, when the movable member connected to the steering wheel is rotated in one direction or the other, the inverted portion of the cable is moved in the same direction as the rotating direction of the movable member, thereby effecting wrapping or unwrapping about the movable member.

Other objects and features of the invention will be more fully understood from the following detailed description and appended claims when taken with the accompanying drawings.

DETAILED DESCRIPTION OF THE PREFERRED EMBODIMENTS

A first preferred embodiment of the present invention will be described with reference to FIGS. 1 to 8.

Referring to FIGS. 1 to 4, a clock spring connector according to the first preferred embodiment is generally constructed of a lower case 1, an upper case 2 rotatably retained with respect to the lower case 1, a spacer 3 rotatably interposed between the lower case 1 and the upper case 2, a gear 4 for rotationally driving the spacer 3, and a plurality of wire-like flexible cables 5 accommodated in a wrapped condition between the lower case 1 and the upper case 2.

The lower case 1 is comprised of an annular bottom wall 7 having a central opening 6, a cylindrical inner side wall 8 rising from an inner circumference of the bottom wall 7, and a cylindrical outer side wall 9 rising from an outer circumference of the bottom wall 7. Thus, the lower case 1 has a generally annular, cylindrical shape with a bottom. The bottom wall 7 is formed with a plurality of cylindrical partition walls 10 projecting upwardly and arranged in a concentric relationship with one another with respect to the central opening 6, so that a plurality of (five in this preferred embodiment) first cable accommodating grooves 11 defined in a concentric relationship with one another by the cylindrical partition walls 10 and the cylindrical inner side wall 8. Each of the first cable accommodating grooves 11 is formed at its bottom with a cable leading hole 27 (see FIG. 7). Further, an outer circumferential portion of the bottom wall 7 formed between the outermost cylindrical partition wall 10 and the cylindrical outer side wall 9 is formed with a first annular rack 12 meshing with the gear 4.

Figure 1:
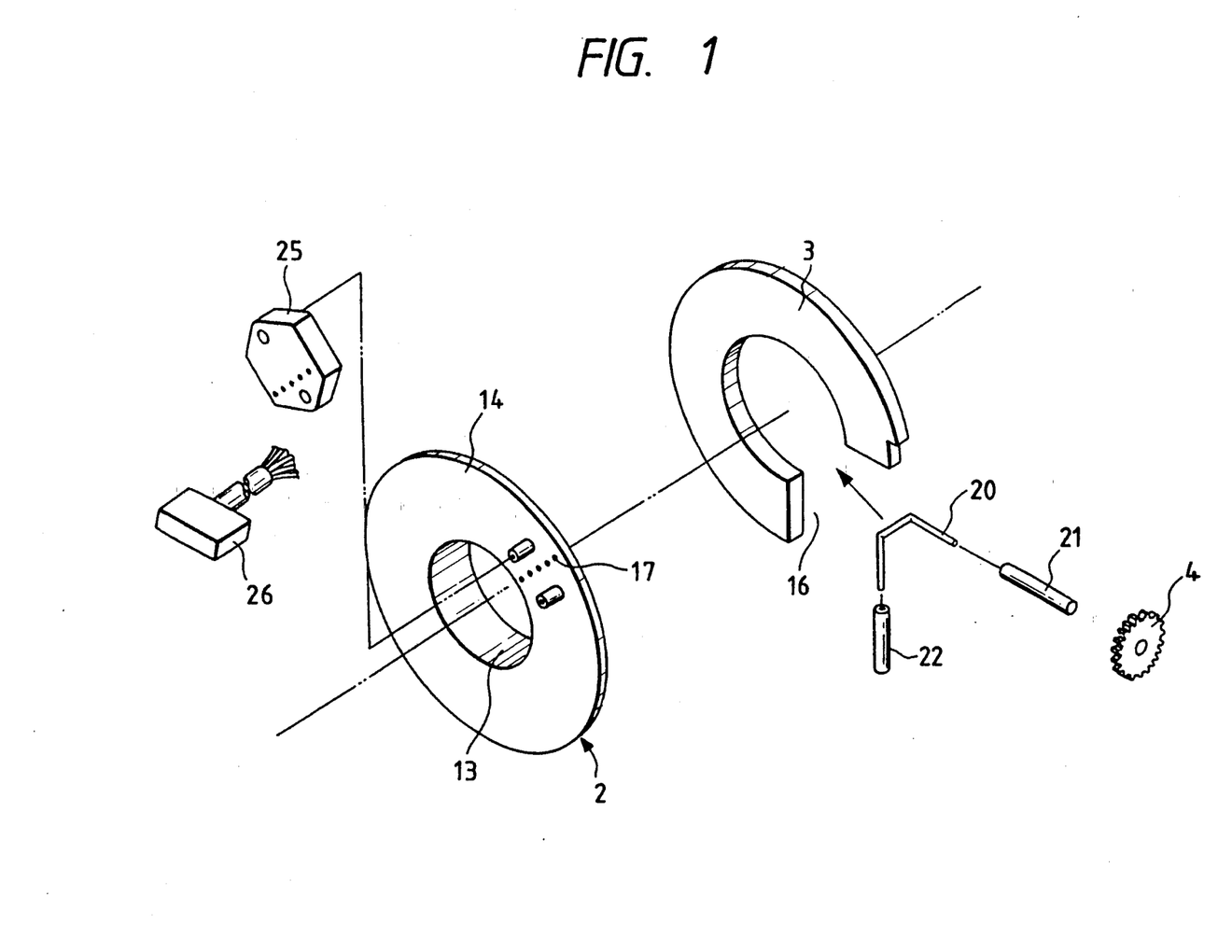
FIGS. 1 and 2 are exploded perspective views of the clock spring connector according to a first preferred embodiment of the present invention.
Figure 2:
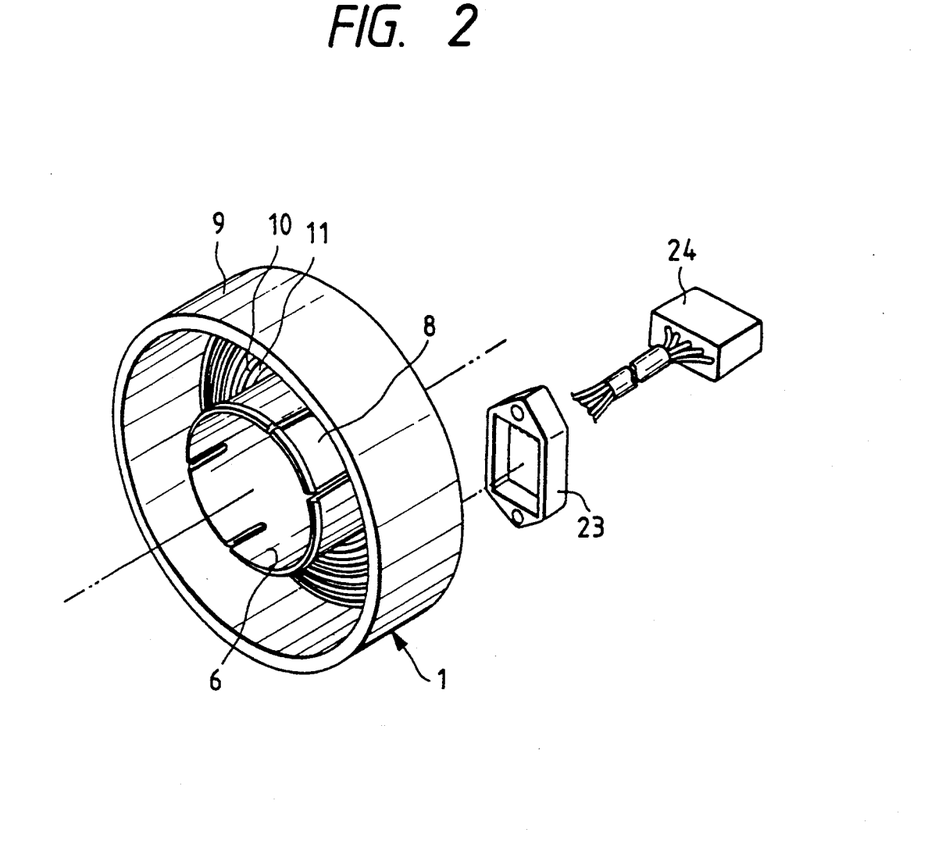
Figure 3:
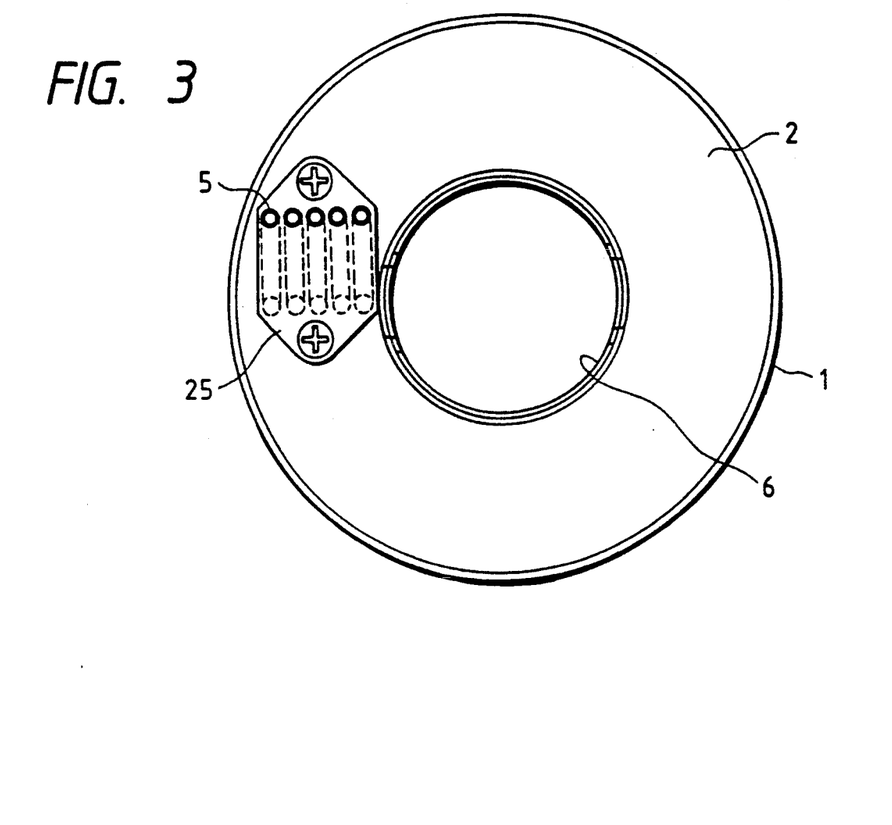
FIG. 3 is a top plan view of the clock spring connector shown in FIGS. 1 and 2.
Figure 4:
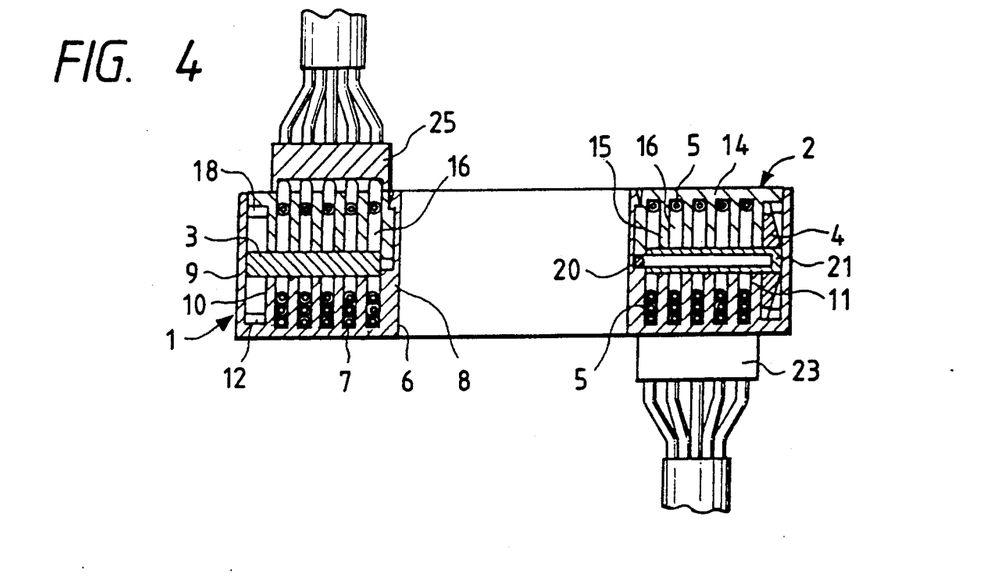
FIG. 4 is a vertical sectional view of FIG. 3.
Figure 5:
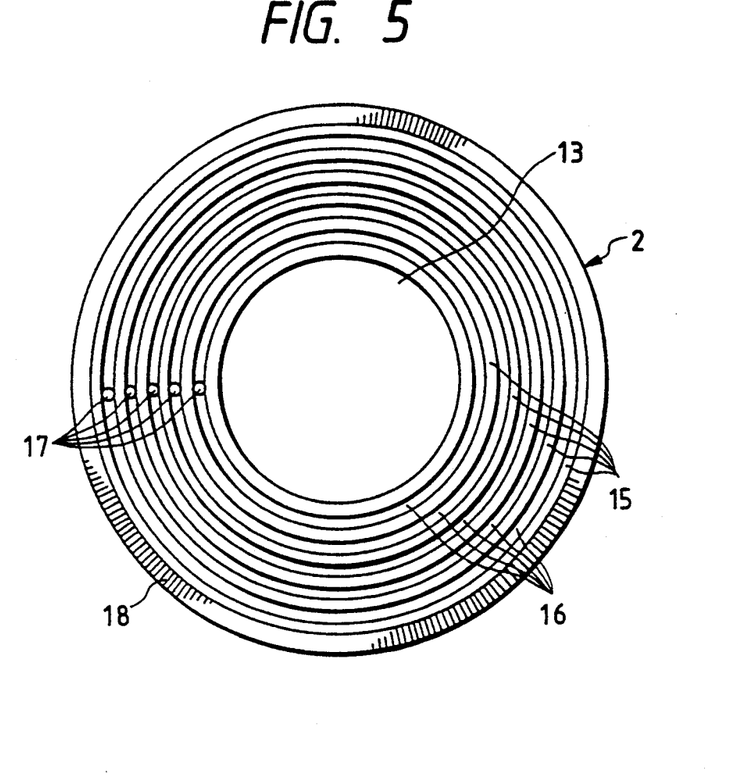
FIG. 5 is a bottom plan view of an upper case shown in FIG. 1.

As shown in FIGS. 1, 4 and 5, the upper case 2 is comprised of an annular top wall 14 having a central opening 13, and a cylindrical inner side wall 2a dependent upon an inner circumference of the top wall 14. The cylindrical inner side wall 2a of the upper case 2 is fitted with the inside of the cylindrical inner side wall 8 of the lower case 1 in a snap fashion, so that the upper case 2 is rotatably connected to the lower case 1. The top wall 14 is formed with a plurality of cylindrical partition walls 15 projecting downward and arranged in a concentric relationship with one another with respect to the central opening 13, so that a plurality of (five in this preferred embodiment) second cable accommodating grooves 16 defined in a concentric relationship with one another by the cylindrical partition walls 15 and the cylindrical inner side wall 2a. The second cable accommodating grooves 16 are opposed through the spacer 3 to the first cable accommodating grooves 11. Each of the second cable accommodating grooves 16 is formed at its top with a cable leading hole 17 (see FIGS. 1 and 7). Further, an outer circumferential portion of the top wall 14 is formed with a second annular rack 18 meshing with the gear 4.

Figure 6:
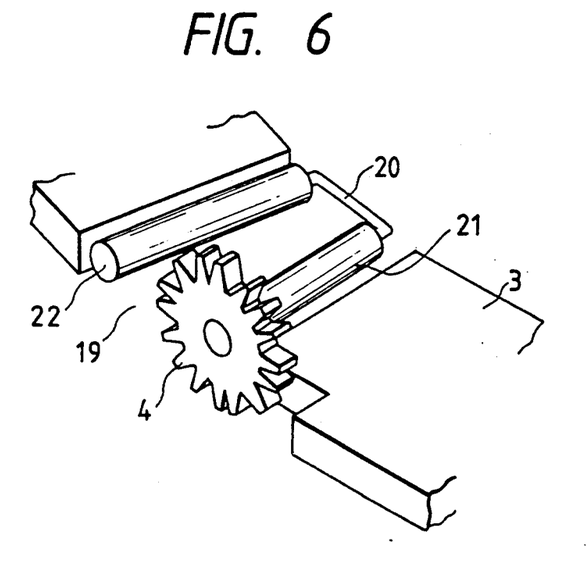
FIG. 6 is a perspective view illustrating a supporting structure of a gear shown in FIG. 1.

The spacer 3 is formed of a smooth material such as synthetic resin molding, and it has a generally annular, diskshaped configuration with a portion thereof removed to form a cutout 19 (see FIGS. 1 and 6). As shown in FIG. 4, the spacer 3 is rotatably positioned between upper ends of the cylindrical partition walls 10 of the lower case 1 and lower ends of the cylindrical partition walls 15 of the upper case 2. As shown in FIGS. 1 and 6, a substantially U-shaped shaft member 20 having two arms is received within the cutout 19, and a first roller 21 and a second roller 22 are rotatably mounted on the two arms of the shaft member 20, respectively. The gear 4 is press-fitted with one end of the first roller 21. As previously mentioned, the gear 4 is in mesh with both the first annular rack 12 and the second annular rack 18.

Figure 7:
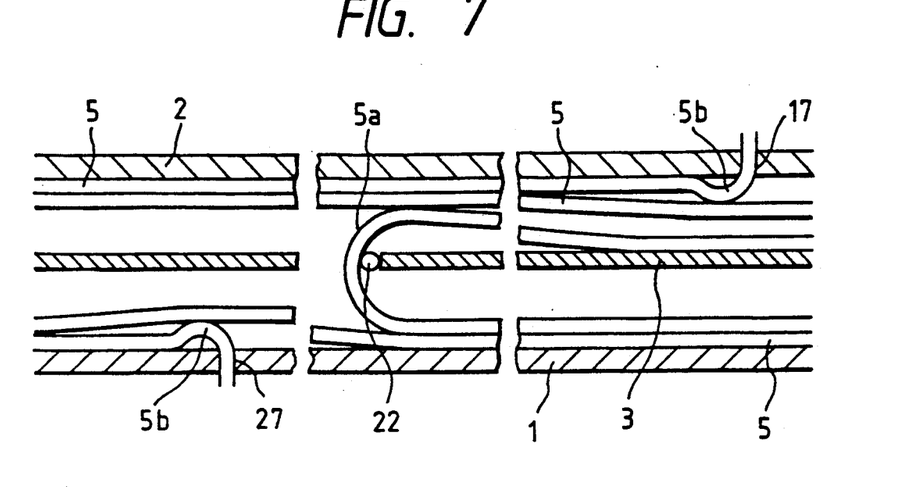
FIG. 7 is a vertical sectional view illustrating a wrapped condition of a flexible cable.

Each flexible cable 5 is a so-called round cable constructed of a conductor wire and an insulator covering the conductor wire. In this preferred embodiment, five round cables each having such a construction are employed as the flexible cables 5. As shown in FIGS. 4 and 7, one portion of each flexible cable 5 is accommodated in each first cable accommodating groove 11 of the lower case 1 with a plurality of revolutions in a stacked condition, and the other portion is accommodated in each second cable accommodating groove 16 of the upper case 2 opposed to the corresponding first cable accommodating groove 11 with a plurality of revolutions in a stacked condition. As best seen in FIG. 7, an inner end of the one portion of each flexible cable 5 accommodated in each first groove 11 passes through the cutout 19 of the spacer 3, and is almost semi-circularly inverted about the second roller 22 to form an inverted portion 5a continuing to an inner end of the other portion of the flexible cable 5 in the corresponding second groove 16, while an outer end of the one portion of each flexible cable 5 accommodated in each groove 11 is led out of the lower case 1 through the corresponding cable leading hole 27. The flexible cables 5 led outside the lower case 1 are bent like a crank and fixed together in a holder 23 attached to a lower surface of the bottom wall 7 of the lower case 1, and are then bundled to be connected to a lower connector 24. On the other hand, an outer end of the other portion of the flexible cable 5 accommodated in each second groove 16 is led out of the upper case 2 through the corresponding cable leading hole 17. The flexible cables 5 led outside the upper case 2 are bent like a crank and fixed together in a holder 25 attached to an upper surface of the top wall 14 of the upper case 2, and are then bundled to be connected to an upper connector 26. Further, as shown in FIG. 7, since the cable leading holes 27 and 17 extend perpendicularly to circumferential lengths of the first and second grooves 11 and 16, respectively, upper and lower leading portions 5b of each flexible cable 5 positioned immediately inside the cable leading holes 27 and 17 are curved semi-circularly inward.

Figure 8A:
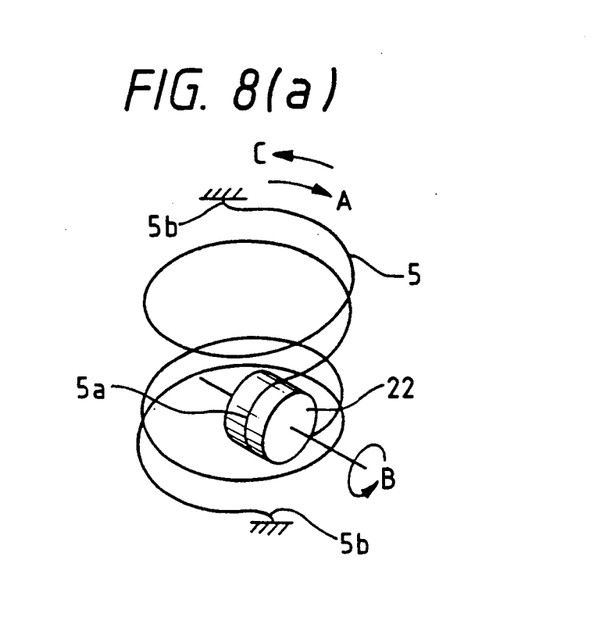
FIGS. 8A, 8B and 8C are schematic illustrations of the operation of the clock spring connector.
Figure 8B:
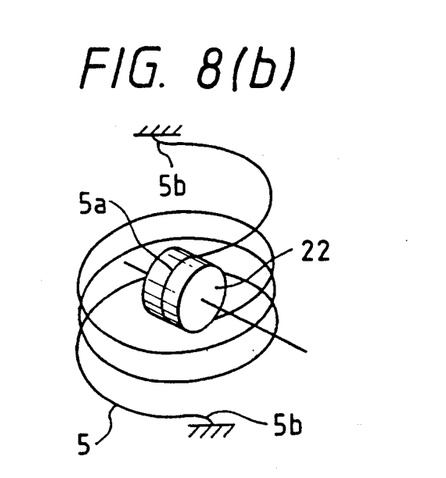
Figure 8C:
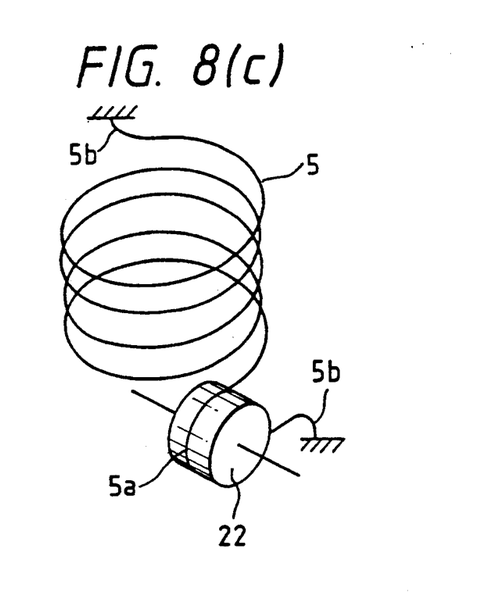

The operation of the clock spring connector according to the first preferred embodiment will next be described primarily with reference to FIGS. 8A to 8C in the case where the lower case 1 is used as a fixed member and the upper case 2 is used as a movable member. FIGS. 8A to 8C schematically show one of the flexible cables 5 and omit the lower case 1, the upper case 2, the spacer 3, etc. for ease of understanding.

FIG. 8A shows a neutral condition where an amount of wrapping of the flexible cable 5 in the first cable accommodating groove 11 of the lower case 1 is substantially the same as that in the second cable accommodating groove 16 of the upper case 2. Generally, the clock spring connector is operated most frequently in such a neutral condition in relation to a steering device within which the clock spring connector is mounted (i.e., a steering wheel for an automobile is operated most frequently at a central position in a rotatable range of the steering wheel or in the vicinity of the central position). In the neutral condition, the inverted portion 5a of each flexible cable 5 is circumferentially spaced a sufficient distance from the upper and lower leading portions 5b of the same flexible cable 5 as shown in FIG. 7, so that the inverted portion 5a is prevented from being urged by the upper and lower leading portions 5b in the neutral condition.

When the upper case 2 is rotated a predetermined amount from the neutral condition shown in FIG. 8A in a clockwise direction (i.e., in a direction of arrow A shown in FIG. 8A), the gear 4 meshing with both the rack 12 of the lower case 1 and the rack 18 of the upper case 2 is rotated in a counterclockwise direction (i.e., in a direction of arrow B shown in FIG. 8A) about an axis of the roller 21, and simultaneously is revolved in the direction of arrow A about an axis of the upper case 2 by half of the rotational amount of the upper case 2. Accordingly, the spacer 3 supporting the gear 4 is also rotated in the direction of arrow A by the same amount as the revolutionary amount of the gear 4 (i.e., by half of the rotational amount of the upper case 2). Similarly, the inverted portion 5a of each flexible cable 5 almost semicircularly inverted about the second roller 22 is also moved in the direction of arrow A by the same amount as the rotational amount of the spacer 3 (i.e., by half of the rotational amount of the upper case 2). As a result, the flexible cable 5 accommodated in each second cable accommodating groove 16 of the upper case 2 is taken out by a length equal to the moving amount of the inverted portion 5a, and is received into each first cable accommodating groove 11 of the lower case 1.

In this manner, when the upper case 2 is rotated by an amount of N revolutions, the spacer 3 and the gear 4 with the second roller 22 are revolved about the axis of the upper case 2 by an amount of N/2 revolutions, and each flexible cable 5 in the second cable accommodating groove 16 is taken out by a length equal to the amount of N/2 revolutions and is received through the cutout 19 of the spacer 3 into the corresponding first cable accommodating groove 11 of the lower case 1. Until the flexible cable 5 accommodated in the second cable accommodating groove 16 of the upper case 2 is entirely taken out and received into the first cable accommodating groove 11 of the lower case 1 as shown in FIG. 8B; that is, until the number of revolutions of the upper case 2 becomes twice the number of wrappings of the flexible cable 5 in the upper case 2, the upper case 2 is allowed to be rotated in the clockwise direction, i.e., in the direction of arrow A. Finally, when the number of revolutions of the upper case 2 becomes twice the number of wrappings of the flexible cable 5 in the upper case 2, the rotation of the upper case 2 in the clockwise direction is terminated.

Converse to the above case, when the upper case 2 is rotated a predetermined amount from the neutral condition in a counterclockwise direction (i.e., in a direction of arrow C shown in FIG. 8A), the gear 4 is rotated in a clockwise direction (i.e. in a direction opposite to the direction of arrow B) about the axis of the roller 21, and simultaneously is revolved in the direction of arrow C about the axis of the upper case 2 by half of the rotational amount of the upper case 2. Accordingly, as shown in FIG. 8C, the flexible cable 5 accommodated in each first cable accommodating groove 11 of the lower case 1 is taken out through the cutout 19 of the spacer 3 by a length equal to the revolutionary amount of the gear 4 (i.e., by half of the rotational amount of the upper case 2), and is received into the corresponding second cable accommodating groove 16 of the upper case 2.

In the above-mentioned operation, when the inverted portion 5a of each flexible cable 5 passes over the upper and lower leading portions 5b, the inverted portion 5a is inwardly urged by the leading portions 5b to reduce a radius of curvature. However, since the frequency of this disadvantage is very little, there is no possibility of the inverted portion 5a being buckled by the leading portions 5b, and there is also no possibility of rupture of the inverted portion 5a due to bending fatigue.

According to the first preferred embodiment, the necessary length of each flexible cable 5 can be reduced to about half of a required rotational amount of the movable member. Accordingly, the length of each flexible cable 5 can be reduced more than that of the prior art flexible cable. Furthermore, as an inexpensive round cable is used since the flexible cable 5, a total cost of the clock spring connector can be greatly reduced. Moreover, since each flexible cable 5 is short, a cable accommodating chamber defined between the fixed member and the movable member can be reduced in diameter to thereby advantageously realize a compact size of the clock spring connector.

Further, the opposed surfaces of the lower case 1 and the upper case 2 are formed with the first cable accommodating grooves 11 and the second cable accommodating grooves 16 arranged separately and concentrically with the same groove pitch, and the spacer 3 is interposed between the first cable accommodating grooves 11 and the second cable accommodating grooves 16. Accordingly, in addition to preventing the plural flexible cables 5 in the first and second cable accommodating grooves 11 and 16 from being entangled with each other, one portion of each flexible cable 5 in the first cable accommodating groove 11 can be prevented from being entangled with the other portion of the same flexible cable 5 in the corresponding second cable accommodating groove 16. Thus, wrapping and unwrapping of the flexible cables S can be smoothly effected.

In addition, since the gear 4 is arranged with the spacer 3 so as to mesh with both the annular racks 12 and 18 formed on the opposed surfaces of the lower case 1 and the upper case 2, the spacer 3 can follow the movement of the inverted portion 5a of each flexible cable 5. Therefore, no undue force is applied to the flexible cables 5, and also from this viewpoint, the wrapping and unwrapping of the flexible cables 5 can be smoothly effected.

Figure 9:
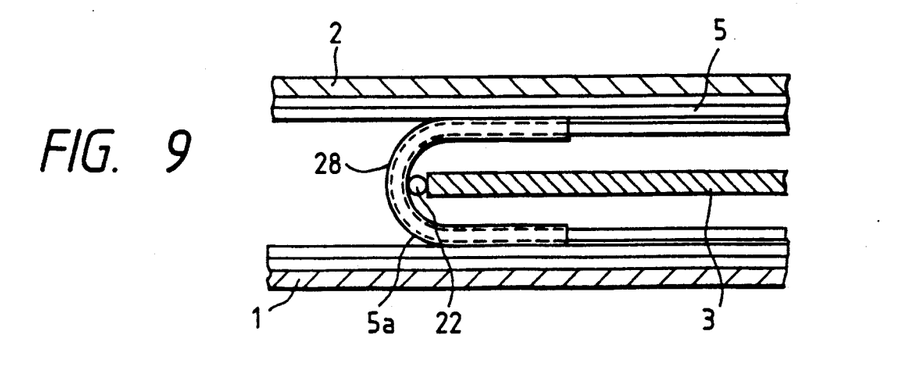
FIG. 9 is a vertical sectional view of an essential part of the clock spring connector according to a second preferred embodiment of the present invention.

FIG. 9 is a vertical sectional view of an essential part of the clock spring connector according to a second preferred embodiment, in which the same reference numerals as those in FIGS. 1 to 8 designate the corresponding parts.

The second preferred embodiment is basically identical in construction with the first preferred embodiment with the exception that a longitudinally central portion of each flexible cable 5 is covered with a reinforcing tube 28. According to the second preferred embodiment, the inverted portion 5a of each flexible cable 5 in the neutral condition which occurs most frequently during the operation is enhanced in stiffness by the reinforcing tube 28. In other words, a radius of curvature of the inverted portion 5a can be enlarged by utilizing the stiffness of the reinforcing tube 28. It is therefore possible to further ensure the effects of preventing buckling and bending fatigue of the flexible cables 5. As other means for enhancing the stiffness of the inverted portion 5a of each flexible cable 5, a covering tube of the flexible cable 5 itself may be partially thickened rather than using the reinforcing tube 28. Alternatively, another reinforcing material may be provided inside and outside the covering tube of the flexible cable 5 itself.

Figure 10:
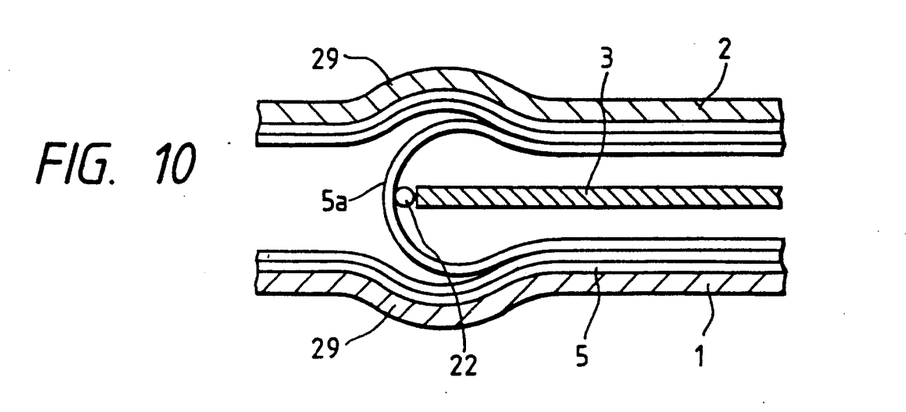
FIG. 10 is a vertical sectional view of an essential part of the clock spring connector according to a third preferred embodiment of the present invention.

FIG. 10 is a vertical sectional view of an essential part of the clock spring connector according to a third preferred embodiment, in which the same reference numerals as those in FIGS. 1 to 8 designate the corresponding parts.

The third preferred embodiment is basically identical in construction with the first and second preferred embodiments with the exception that the bottom wall 7 of the lower case 1 and the top wall 14 of the upper case 2 are formed with opposed expanded portions 29 curved outwardly so that the inverted portion 5a of each flexible cable 5 in the neutral condition is positioned between the opposed expanded portions 29. According to the third preferred embodiment, a radius of curvature of the inverted portion 5a of each flexible cable 5 in the neutral condition can be enlarged by the provision of the expanded portions 29. Therefore, also in this case, it is possible to ensure the effects of preventing buckling and bending fatigue of the flexible cables 5.

In the first to third preferred embodiments, the first and second cable accommodating grooves 11 and 16 are defined by integrally forming the partition walls 10 and 15 with the bottom wall 7 of the lower case 1 and the top wall 14 of the upper case 2, respectively. However, as a modification, the first and second cable accommodating grooves 11 and 16 may be defined by integrally forming the partition walls 10 and 15 with the spacer 3 so as to make them project from upper and lower surfaces of the spacer 3. Alternatively, either one of the first or second cable accommodating grooves 11 or 16 may be defined on the spacer 3 side.

Further, although the gear 14 and the first and second racks 12 and 18 are employed as means for driving the spacer 3 in the first to third preferred embodiments, such a driving means may be constructed by providing a rubber roller rotatably supported to the spacer 3 so as to make the rubber roller rollingly contact with the opposed surfaces of the lower case 1 and the upper case 2.

Further, although the number of the flexible cables 5 is set to five, and the first and second cable accommodating grooves 11 and 16 are provided in the same number as that of the flexible cables 5 in the above preferred embodiments, it is needless to say that the number of the flexible cables 5 and the first and second cable accommodating grooves is not limited to the above. Additionally, it is not necessary to make the directions of wrapping of all the plural flexible cables identical with one another. That is, any of the plural flexible cables may be wrapped in a reverse direction. In this case, since the spacer can be rotationally driven by the flexible cables, any special driving member such as the gear 4 or the rubber roller is not necessary.

Next, a fourth preferred embodiment of the present invention will be described with reference to FIGS. 11 to 13.

Figure 11:
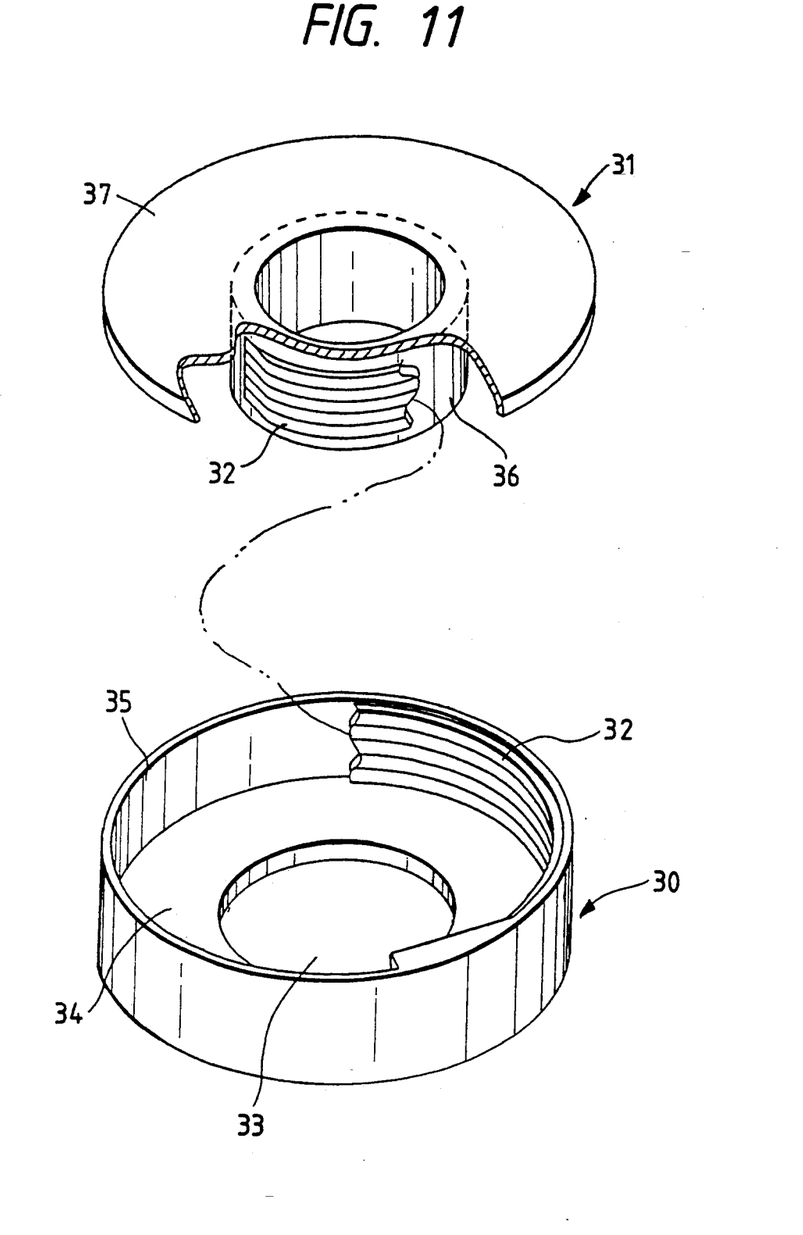
FIG. 11 is a partially cut-away, exploded perspective view of the clock spring connector according to a fourth preferred embodiment of the present invention.
Figure 12:
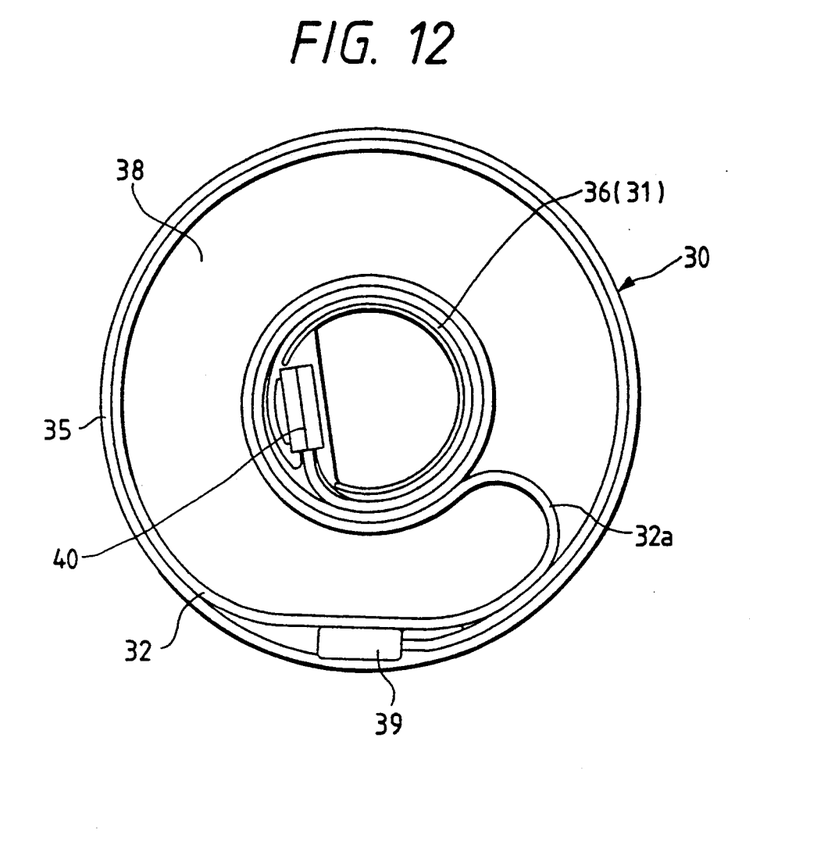
FIG. 12 is a partially omitted, top plan view of an upper case shown in FIG. 11.
Figure 13:
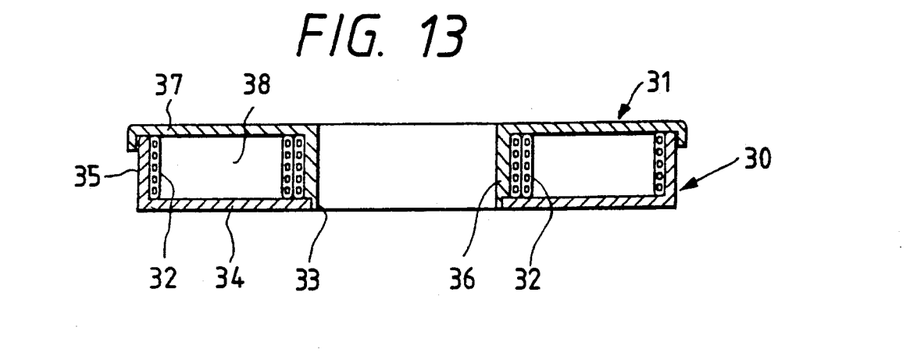
FIG. 13 is a vertical sectional view of the clock spring connector shown in FIG. 11.

Referring to FIGS. 11 to 13, a clock spring connector according to the fourth preferred embodiment is generally constructed of a lower case 30, an upper case 31 rotatably retained with respect to the lower case 30, and a single strip-shaped flexible cable 32 accommodated in a wrapped condition between the lower case 30 and the upper case 31.

The lower case 30 is comprised of an annular bottom wall 34 having a central opening 33, and a cylindrical outer side wall 35 rising from an outer circumference of the bottom wall 34. Thus, the lower case 30 has a generally annular, cylindrical shape with a bottom. On the other hand, the upper case 31 is comprised of an annular top wall 37 having a central opening 37a, and a cylindrical inner side wall 36 dependent upon an inner circumference of the top wall 37. The upper case 31 is rotatably connected to the lower case 30 in such a manner that a lower end of the inner side wall 36 is guided by an inner circumference of the bottom wall 34 and that an outer circumference of the top wall 37 is guided by an upper end of the outer side wall 35. As best seen in FIG. 13, an annular, cylindrical cable accommodating space 38 is defined by the bottom wall 34 and the outer side wall 35 of the lower case 30 and the top wall 37 and the inner side wall 36 of the upper case 31.

The flexible cable 32 is a so-called flat cable constructed of a plurality of parallel conductor wires and a pair of insulator films laminated together so as to cover the parallel conductor wires. In this preferred embodiment, five conductor wires are employed in the flat cable. As shown in FIG. 12, one end of the flexible cable 32 is connected to a first connector 39 fixed to an inner surface of the cylindrical outer side wall 35, and is led out of the lower case 30 through the first connector 39. On the other hand, the other end of the flexible cable 32 is connected to a second connector 40 embedded in the cylindrical inner side wall 36, and is led out of the upper case 31 through the second connector 40. The flexible cable 32 accommodated in the space 38 extends from the first connector 39 and is wrapped on the inner surface of the outer side wall 35 in a counterclockwise direction as viewed in FIG. 12. At the end of the counterclockwise wrapping, the flexible cable 32 is U-shapely inverted to form an inverted portion 32a. The flexible cable 32 further extends inwardly from the inverted portion 32a so as to be wrapped about an outer surface of the inner side wall 36 in a clockwise direction as viewed in FIG. 12 until reaching the second connector 40. A portion of the flexible cable 32 facing the first connector 39 is slightly deflected radially inwardly from the inner surface of the outer side wall 35.

The operation of the clock spring connector according to the fourth preferred embodiment will next be described in the case where the lower case 30 is used as a fixed member and the upper case 31 is used as a movable member.

FIG. 12 shows a neutral condition such that the flexible cable 32 is wrapped both on the inner surface of the outer side wall 35 of the lower case 30 and about the outer surface of the inner side wall 36 of the upper case 31. In this neutral condition, the inverted portion 32a of the flexible cable 32 is positioned circumferentially sufficiently apart from the first and second connectors 39 and 40 so that the inverted portion 32a may not be urged radially inwardly by the first connector 39. When the upper case 31 is rotated from the neutral condition in the clockwise direction, the inverted portion 32a of the flexible cable 32 is moved in the clockwise direction by an amount smaller than a rotational amount of the upper case 31. Accordingly, the flexible cable 32 wrapped on the inner surface of the outer side wall 35 is unwrapped by a length equal to the moving amount of the inverted portion 32a, and is simultaneously wrapped about the inner side wall 36. Thereafter, until the flexible cable 32 wrapped on the inner surface of the outer side wall 35 is entirely unwrapped to be wrapped about the inner side wall 36, the upper case 31 is allowed to be rotated in the clockwise direction. Finally, when the flexible cable 32 is entirely wrapped about the inner side wall 36 as mentioned above, the clockwise rotation of the upper case 31 is terminated.

Converse to the above case, when the upper case 31 is rotated from the neutral condition shown in FIG. 12 in the counterclockwise direction, the inverted portion 32a of the flexible cable 32 is moved in the counterclockwise direction by an amount smaller than a rotational amount of the upper case 31. Accordingly, the flexible cable 32 wrapped about the inner side wall 36 is unwrapped by a length equal to the moving amount of the inverted portion 32a, and is simultaneously wrapped on the inner surface of the outer side wall 35. Thereafter, until the flexible cable 32 wrapped about the inner side wall 36 is entirely unwrapped to be wrapped on the inner surface of the outer side wall 35, the upper case 31 is allowed to be rotated in the counterclockwise direction. Finally, when the flexible cable 32 is entirely wrapped on the inner surface of the outer side wall 35 as mentioned above, the counterclockwise rotation of the upper case 31 is terminated.

In the above-mentioned operation, when the inverted portion 32a of the flexible cable 32 passes over the first connector 39, the inverted portion 32a is urged radially inwardly by the first connector 39 to reduce a radius of curvature. However, since the frequency of this disadvantage is very little, there is no possibility of the inverted portion 32a being buckled by the first connector 39, and there is also no possibility of rupture of the inverted portion 32a due to bending fatigue.

According to the fourth preferred embodiment, the direction of wrapping of the flexible cable 32 on the inner surface of the outer side wall 35 and the direction of wrapping of the flexible cable 32 about the inner side wall 36 are reverse to each other through the inverted portion 32a. Accordingly, a necessary length of the flexible cable 32 can be greatly reduced, resulting in a reduction in total cost and a reduction in size.

Figure 14:
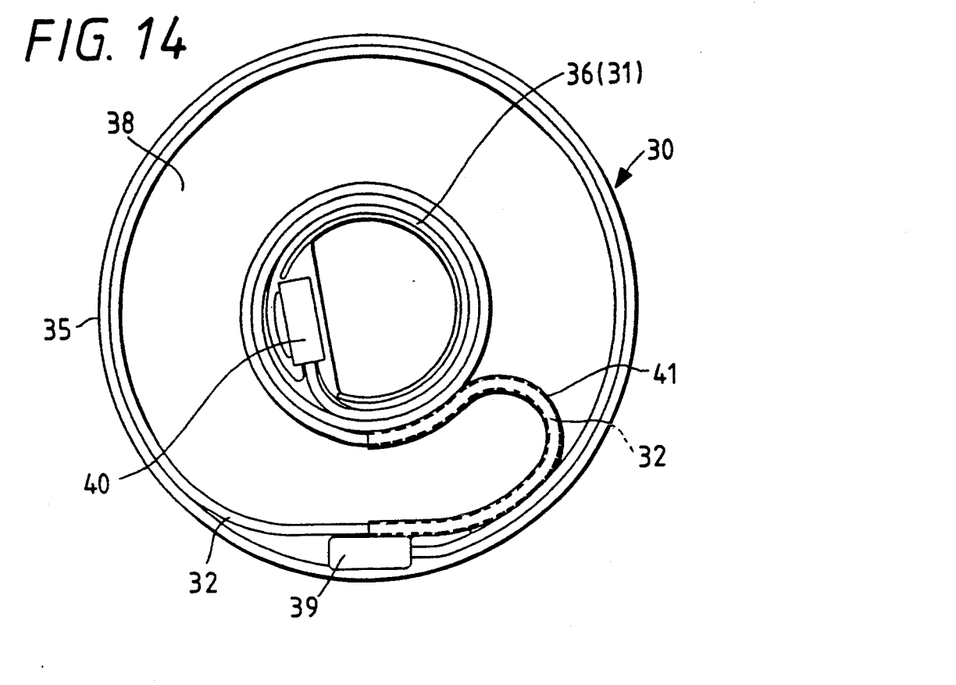
FIG. 14 is a view similar to FIG. 12, showing a fifth preferred embodiment of the present invention.

FIG. 14 is a plan view of the clock spring connector according to a fifth preferred embodiment with a part of the upper case omitted, in which the same reference numerals as those in FIGS. 11 to 13 designate the corresponding parts.

The fifth preferred embodiment is basically identical in construction with the fourth preferred embodiment with the exception that the inverted portion 32a of the flexible cable 32 in the neutral condition is covered with a reinforcing tube 41. According to the fifth preferred embodiment, the inverted portion 32a of the flexible cable 32 in the neutral condition which occurs most frequently during the operation is enhanced in stiffness by the reinforcing tube 41. In other words, a radius of curvature of the inverted portion 32a can be enlarged by utilizing the stiffness of the reinforcing tube 41. It is therefore possible to further ensure the effects of preventing buckling and bending fatigue of the flexible cable 32. As other means for enhancing the stiffness of the inverted portion 32a of the flexible cable 32, a covering tube of the flexible cable 32 itself may be partially thickened rather than using the reinforcing tube 41. Alternatively, another reinforcing material may be provided inside and outside the covering tube of the flexible cable 32 itself.

Figure 15:
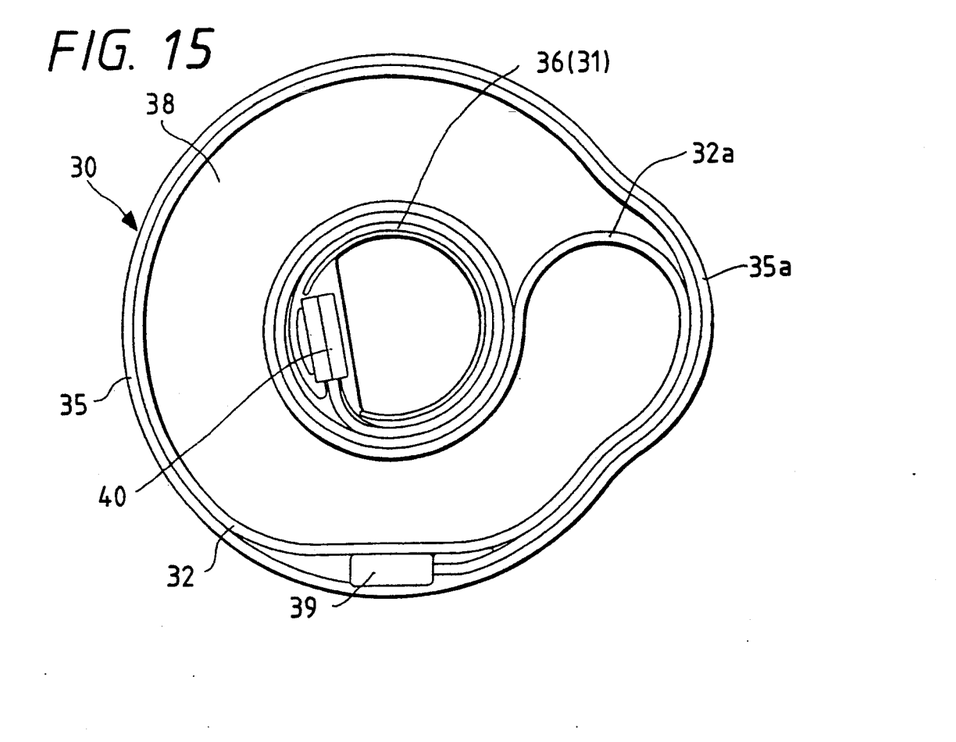
FIG. 15 is a view similar to FIG. 12, showing a sixth preferred embodiment of the present invention.

FIG. 15 is a plan view similar to FIG. 14, showing a sixth preferred embodiment, in which the same reference numerals as those in FIGS. 11 to 13 designate the corresponding parts.

The sixth preferred embodiment is basically identical in construction with the fourth and fifth preferred embodiments with the exception that the outer side wall 35 of the lower case 30 is formed with an expanded portion 35a curved radially outward so that the inverted portion 32a of the flexible cable 32 in the neutral condition is partially positioned in the expanded portion 35a. According to the sixth preferred embodiment, a radius of curvature of the inverted portion 32a of the flexible cable 32 in the neutral condition can be enlarged by the provision of the expanded portion 35a. Therefore, also in this case, it is possible to ensure the effects of preventing buckling and bending fatigue of the flexible cable 32. In modification, the inner side wall 36 of the upper case 31 may be formed with an expanded portion curved radially inwardly instead of the formation of the expanded portion 35a of the outer side wall 35. Alternatively, both the expanded portion 35a of the outer side wall 35 and the expanded portion of the inner side wall 36 may be employed in combination.

Further, although the flexible cable 32 is constructed as a flat cable in the fourth to sixth preferred embodiments, it may be constructed as a strip of plural round cables as employed in the first to third preferred embodiments. In this case, a given number of round cables are integrally connected together in the form of strip according to a necessary number of circuits.

In addition, although the lower case 1 (30) is used as the fixed member, and the upper case 2 (31) is used as the movable member in the first to sixth preferred embodiments, the upper case may be used as the fixed member, and the lower case may be used as the movable member.

While the invention has been described with reference to specific embodiments, the description is illustrative and is not to be construed as limiting the scope of the invention. Various modifications and changes may occur to those skilled in the art without departing from the spirit and scope of the invention as defined by the appended claims.

What is claimed is:

1. In a clock spring including a fixed member, a movable member rotatably mounted on said fixed member with a cable accommodating portion defined therebetween, and a cable accommodated in said cable accommodating portion, said cable having one end fixed to said fixed member and led out of said fixed member and having the other end fixed to said movable member and led out of said movable member; the improvement wherein one of said fixed member and said movable member is provided with an inner cylindrical portion, and the other of said fixed member and said movable member is provided with an outer cylindrical portion, one portion of said cable being wrapped in one direction on an outer surface of said inner cylindrical portion, and the other portion of said cable being wrapped in the opposite direction reverse to said one direction on an inner surface of said outer cylindrical portion, whereby an inverted portion of said cable is formed between said one portion and said other portion, at least one of said said outer surface of said inner cylindrical portion and said inner surface of said outer cylindrical portion being formed with a radially expanded portion, said inverted portion being positioned within said radially expanded portion in a rotationally neutral condition of said movable member.

* * * * *